Patented Oct. 9, 1945

2,386,592

UNITED STATES PATENT OFFICE 2,386,592

BITUMINOUS COMPOSITION AND METHOD OF MAKING SAME

Edward James Canavan, West Englewood, N. J., assignor, by mesne assignments, to Allied Chemical & Dye Corporation, a corporation of New York No Drawing. Application October 10, 1941, Serial No. 414,457

14 Claims. (Cl. 196—152)

This invention relates to a bituminous composition for use in coatings, paints, roofings, roads, rubber compounds, and other fields, and to a method of preparing such composition.

Bituminous substances have long been used in waterproofing materials and as binders and impregnating agents. Among such bituminous substances, coal tar, water-gas tar, their oils and pitches have outstanding qualities, since they are not weakened by exposure to weather and tend to prevent fermentation or decay of the object to which they are applied. Ordinary tar products, however, have the objectionable property of becoming stiff and brittle at low temperature and of becoming soft, and even fluid, at higher temperatures to which they may be subjected in service, i. e. they are very susceptible to temperature changes.

The ratio of change in consistency to change in temperature within the range of temperatures to which such compositions are subjected in use will be referred to in the specification and claims as the temperature-susceptibility factor. A high temperature-susceptibility factor indicates a product whose consistency is changed considerably with change in temperature, e. g. ordinary coal tar has a high factor; and a low temperature-susceptibility factor indicates a product whose consistency changes only slightly with change in temperature.

It is an object of the present invention to provide a new bituminous composition having a smooth, homogeneous texture, a rubbery or resilient nature, and a low temperature-susceptibility factor at the temperatures to which it is subjected in use. It is a further object to provide such a bituminous composition suitable for use as a coating material to form resilient adherent coatings having an exceptionally smooth, glossy appearance. The composition of the invention may advantageously be used for coating metal surfaces such as pipes. For many purposes the composition is superior to pitch compositions of the prior art.

It is an additional object of the present invention to provide a new method for treating tar products to form products having low temperature-susceptibility factors, which method does not require the rigid control of time and temperature of heating required by hitherto known processes for improving the temperature-susceptibility factors of tar products.

I have made the surprising discovery that by digesting coal tar, water-gas tar, their pitches and distillate oils with an asphaltic pyrobitumen, the fixed carbon content of which is at least 50% and having the chemical and physical properties enumerated below, the digestion being carried out so that the non-ash constituents of the mixture behave substantially as a homogeneous blend, a novel bituminous composition with pronounced rubbery properties, and a low temperature-susceptibility factor results.

The chemical and physical properties of the asphaltic pyrobitumen I have found to give the surprising result are: It is black in color; has a specific gravity of about 1.1 to about 1.25 at 77° F.; contains at least 50% fixed carbon, and may contain from 50% to 90%; contains a small amount of constituents soluble in carbon bisulfide, e. g., not more than about 10%, and usually not more than about 6%; it is constituted almost entirely of non-mineral constituents insoluble in carbon bisulfide, e. g., as much as 99.5% and not less than about 90%; is solid at atmospheric temperatures; is substantially infusible; and ordinarily decrepitates on heating in a flame.

An example of such asphaltic pyrobitumen is the material known as impsonite, a large deposit of which occurs in La Flore County, Oklahoma.

Impure grades of impsonite, containing as high as 25% of associated mineral constituents, may be digested to obtain products having in general the characteristics described for products obtained by digesting the purer grades of this asphaltic pyrobitumen. The associated mineral constituents may be dispersed in finely-divided form throughout the product, or may be removed from the product by settling or other suitable means.

Coal tar, water-gas tar, their pitches and distillate oils may be mixed with from 5% to 50% based on the weight of the mixture of an asphaltic pyrobituminous material, as hereinabove described, and the mixture heated to a temperature sufficient to bring about a reaction, i. e., digestion of the asphaltic pyrobitumen in the tar product, so that the non-ash constituents of the mixture behave substantially as a homogeneous blend. While the exact nature of the reaction is not known, it appears that the asphaltic pyrobitumen having the properties hereinabove enumerated disperses in a finely divided condition to form what is apparently a colloidal solution or dispersion. The heating may be carried out in a closed vessel fitted with a reflux condenser operative for total or for partial condensation of vapors and an agitator to effect agitation of the mixture during heating. If desired, the reaction may be carried out at pressures above or below atmospheric pressure. The reaction starts when the temperature reaches 215°–230° C.; at this point evolution of vapors comprising water takes place. The reaction continues throughout the further heating, becoming more active as the temperature rises. The temperature of the mixture is raised to above 240° C., preferably within the range of 260–350° C., and may be raised to 400° C. or even higher, and the mixture is held at such temperature for a period sufficient to effect digestion of the asphaltic pyrobituminous material. This period may be as long as two hours, or more, when the temperature is below 260° C., and may be much shorter at higher temperatures. For example, at or above a temperature of 290° C. substantially complete digestion of the pyrobitumen is attained within thirty minutes. Operating at digestion temperatures within the range 260°–330° C., for a given amount of digested pyrobitumen relative to the amount of the coal tar, water-gas tar, or their pitches and distillate oils, employed as the digesting medium, and under conditions such that the resulting product is not hardened by removal of distillate, I have made the surprising discovery that the temperature of digestion has practically no effect on the characteristic properties such as softening points, penetrations, temperature susceptibilities, and resistance to slide of the resulting products. At temperatures from 260° to 290° C., a longer time of heating is required for complete digestion, but the products formed have practically the same softening points and penetrations as the products from the digestion for a shorter time at higher temperatures within the range 290°–330° C.

In a preferred form of the invention, from 5% to 35% impsonite is added to the digesting medium, which may be dehydrated coal tar, dehydrated water-gas tar, coal-tar pitch having a softening point within the range 25°–100° C., water-gas tar pitch having a softening point within the range 25°–100° C., or a distillate oil obtained from such coal tar or water-gas tar distilling substantially within the range of from 200° to 500° C. The digestion medium may be a mixture of coal tar, water-gas tar, or pitches or distillates obtained from these tars. The mixture is slowly heated to a temperature within the range 290°–330° C. while agitating, and is held within this temperature range for about thirty minutes. At the end of this time the impsonite is completely digested and there is obtained a product having a smooth, homogeneous structure, a relatively high penetration at 25° C., and a low temperature-susceptibility factor as compared to coal tar materials of a corresponding softening point. Further, the product produced has a rubbery or resilient character, i. e., when bent or twisted it will of itself tend to straighten out and recover its original form. The product possesses water-proofing properties to a high degree, and when used as a coating adheres firmly to metal and other surfaces, and forms smooth, glossy films or layers.

The following examples are illustrative but the invention is not limited to the specific details set forth therein. In all the examples, impsonite obtained from a natural deposit occurring in Oklahoma, pulverized so as to pass a 10-mesh sieve, was employed. This material had a black color, contained about 75% fixed carbon and about 89% carbon by ultimate analysis, had about 23%–24% volatile combustible material, contained about 1% ash, about 2% constituents soluble in carbon bisulfide, was infusible, and decrepitated on heating in a flame.

*Group 1*

In this group of examples, the digesting medium employed was a high-boiling coal-tar distillate having a viscosity (Saybolt-Furol) at 60° C. of 52.5 seconds, and a specific gravity at 38/15.5° C. of 1.157, i. e., specific gravity determined at 38° C. using a hydrometer calibrated at 15.5° C. The tar distillate when distilled to 355° C. in accordance with A. S. T. M. Method D246-39, lost about 16% of oil as distillate.

In Example 1 of this group, 5 parts of the aforementioned impsonite were added to 95 parts of the tar distillate and the mixture digested for one-half hour at 300° C. A homogeneous fluid product resulted having a viscosity (Saybolt-Furol) at 60° C. of 159 seconds. This product was too soft to permit the conduct of penetration and softening point tests thereon.

In Example 2 of this group, 90 parts of the tar distillate were digested with 10 parts of the impsonite for one-half hour at 300° C. A substantially homogeneous product having a softening point of 80° F. (R. & B.) resulted. This product had a viscosity (Saybolt-Furol) at 60° C. of 1249 seconds; a viscosity (Saybolt-Furol) at 80° C. of 182 seconds, and showed a penetration at 25° C. of 345.

In Example 3 of this group, 85 parts of the tar distillate were digested with 15 parts of impsonite for one-half hour at 300° C. A substantially homogeneous product having a softening point of 117° F. (R. & B.) resulted, showing a penetration at 25° C. of 195.

In Example 4 of this group, 80 parts of the tar distillate were digested with 20 parts of impsonite for one-half hour at 300° C. A substantially uniform, homogeneous product resulted having a softening point of 162° F. (R. & B.), and showing a penetration at 25° C. of 62.

In Example 5 of this group, 75 parts of the tar distillate were digested with 25 parts of impsonite for one-half hour at 300° C. A uniform homogeneous product resulted having a softening point of 216° F. (R. & B.), and showing a penetration of 10 at 0° C., of 25 at 25° C., and of 46 at 46.1° C.

In Example 6 of this group, 70 parts of the tar distillate were digested with 30 parts of impsonite for one-half hour at 300° C. A uniform, homogeneous product resulted having a softening point of 248° F. (R. & B.) and showing a penetration at 25° C. of 16.

In Example 7 of this group, 65 parts of the tar distillate were digested with 35 parts of impsonite for one-half hour at 300° C. A uniform, homogeneous product resulted having a softening point of 300° F. (R. & B.) and showing a penetration at 25° C. of 2.

In Example 8 of this group, 75 parts of the tar distillate were digested with 25 parts of impsonite for two hours at 260° C. A uniform homogeneous product resulted having a softening point of 219° F. (R. & B.) and showing a penetration of 9 at 0° C., of 22 at 25° C. and of 40 at 46.1° C.

In Example 9 of this group 75 parts of the tar distillate were digested with 25 parts of impsonite for one-half hour at 330° C. A uniform homogeneous product resulted having a softening point of 214° F. and having penetration values similar to those of the product of Examples 5 and 8.

Group 2

*Example 10.*—20 parts of the aforementioned impsonite were mixed with 80 parts of refined coke-oven tar having a float test at 50° C. of 180 seconds, and a softening point of 97° F. (R. & B.). The mixture was heated at 300° C. for one-half hour. Digestion took place, resulting in a product having a softening point of 200° F. (R. & B.).

*Example 11.*—25 parts of the aforementioned impsonite were mixed with 75 parts of refined coke-oven tar having a float test at 50° C. of 180 seconds, and a softening point of 97° F. (R. & B.). The mixture was heated at 300° C. for one-half hour. Digestion took place, resulting in a product having a softening point of 230° F. (R. & B.).

*Example 12.*—20 parts of the aforementioned asphaltic pyrobitumen were mixed with 80 parts of dehydrated coke oven tar having a float test at 50° C. of 75 seconds. The mixture digested at 300° C. for one-half hour. A homogeneous product resulted having a softening point of 194° F. (R. & B.).

*Example 13.*—80 parts of coal-tar distillate oil having a specific gravity at 38/15.5° C. of 1.175 and which when distilled to 355° C. by A. S. T. M. Method D246–39 lost about 6% of oil as distillate, were mixed with 20 parts of the aforementioned impsonite, and the mixture digested at 300° C. for 30 minutes. A homogeneous product resulted having a softening point of 181° F. (R. & B.). This product when subjected to penetration tests showed a penetration of 12 at 0° C., of 27 at 25° C., and of 95 at 46.1° C.

*Example 14.*—67 parts of high-boiling coal-tar distillate oil having a specific gravity at 38/15.5° C. of 1.175 and which when distilled to 355° C. by A. S. T. M. Method D246–39 lost about 6% of oil as distillate, were mixed with 33 parts of the aforementioned impsonite, and the mixture digested at 300° C. for 30 minutes. The resulting product had a softening point of 279° F. (R. & B.), and when subjected to penetration tests showed a penetration of 1 at 0° C., of 5 at 25° C., and of 8 at 46.1° C.

*Example 15.*—80 parts of coke-oven tar pitch, having a melting point of 120.5° F. by the cube method, were mixed with 20 parts of impsonite, and the mixture digested at 300° C. for 30 minutes. The resulting product had a softening point of 189° F. (R. & B.), and when subjected to penetration tests showed a penetration of 1 at 0° C., of 8 at 25° C., and of 26 at 46.1° C.

The softening points and penetrations are determined in accordance with procedure using standard apparatus prescribed by the American Society for Testing Materials. Penetrations are given in tenth-millimeters; for penetrations at 0° C., 200 grams are applied for 60 seconds; for penetrations at 25° C., 100 grams are applied for 5 seconds; and for penetrations at 46.1° C., 50 grams are applied for 5 seconds.

Paint-type coating and primer compositions may be prepared by combining from about 45% to about 65% by volume, preferably about 55%, of asphaltic pyrobitumen digestion product with from 55% to 35%, preferably about 45%, of a coal tar solvent, e. g., coal tar heavy solvent naphtha.

In making such coating compositions, the digestion product, if not already in liquid condition, is liquefied by heating, preferably to a temperature about 50° C. above its softening point, the molten product is mechanically agitated, and the solvent is slowly added thereto, either continuously or in stages. The digestion product and solvent form a gel, i. e., a dispersion with plastic properties of colloidal and finely divided material in a liquid phase comprising the tar product digestion medium and the solvent. Such compositions have been found highly satisfactory as paints to form protective coatings, and also as primers for metal surfaces which are to be coated with bituminous enamels. The lower the solvent content, the more pronounced are the gel-like properties of the coating composition. Coating compositions of low solvent content, i. e., 35–40% by volume, have a relatively stiff (gelatinous) consistency and accordingly are particularly adapted for application of thick films or coatings.

The following is an example of a paint coating composition prepared according to my invention:

*Example 16.*—55 parts by volume of the digestion product of Example 15, having a softening point of 189° F., were heated to a temperature of about 280° F., and 45 parts of a coal tar heavy solvent naphtha distilling substantially between 150° and 200° C. were slowly added with agitation. The resulting composition was in the nature of a gel, and had a consistency suitable for application by brushing or spraying. The product formed a tough, glossy coating when applied on metal.

The hereinabove described coating compositions, it is to be understood, are also suitable for adhesive purposes. For example, they may be employed for cementing felt to metal or felt to felt, etc.

It will be noted from the foregoing that my invention provides a bituminous composition having very low temperature-susceptibility factors compared with ordinary products of distilled tar and pitch. Desirable bituminous paint compositions may be obtained by using the digestion product of the invention as the base. The process of this invention is readily controlled, and results in reproducible products of uniform, homogeneous, bituminous compositions. By "tar products," as used herein, is meant coal tar, water-gas tar, and the oils and pitches derived from such tars.

I claim:

1. A substantially homogeneous bituminous digestion product having a low temperature-susceptibility factor comprising a tar product from the group consisting of coal tar, water-gas tar, their oils and pitches, and an asphaltic pyrobituminous material having the following properties: specific gravity at 77° F., from about 1.1 to about 1.25; non-mineral constituents, more than 50% fixed carbon; solid at atmospheric temperatures; and substantially infusible.

2. A substantially homogeneous bituminous digestion product having a low temperature-susceptibility factor comprising a tar product from the group consisting of coal tar, water-gas tar, their oils and pitches, combined with from about 5% to about 50% of an asphaltic pyrobitumen having the following chemical and physical properties: color, black; specific gravity at 77° F., from about 1.1 to about 1.25; fixed carbon, about 50% to 90%; soluble in carbon bisulfide, not more than about 10%; non-mineral constituents insoluble in carbon bisulfide, 90 to 99.5%; solid at atmospheric temperatures; and substantially infusible.

3. A substantially homogeneous digested bituminous material having a smooth texture and a low temperature-susceptibility factor comprising coal tar digested with impsonite.

4. A substantially homogeneous digested bituminous material having a smooth texture and a low temperature-susceptibility factor comprising coal tar digested with from about 5% to about 50% impsonite.

5. A substantially homogeneous digested bituminous material having a smooth texture and a low temperature-susceptibility factor comprising water-gas tar digested with impsonite.

6. A method of preparing a bituminous product which comprises mixing a tar product from the group consisting of coal tar, water-gas tar, their oils and pitches, with an asphaltic pyrobituminous material having the following properties: specific gravity at 77° F., from about 1.1 to about 1.25; non-mineral constituents, more than 50% fixed carbon; solid at atmospheric temperatures; and substantially infusible, and heating the mixture to above about 240° C. to digest the asphaltic pyrobitumen material and form a substantially homogeneous product having a low temperature-susceptibility factor.

7. A method of preparing a bituminous composition which comprises mixing a tar product from the group consisting of coal tar, water-gas tar, their oils and pitches with from about 5% to about 50% of impsonite, and heating the mixture to a temperature within the range of about 260° C. to 350° C. for a time sufficient to digest and disperse the impsonite in the tar product to form a substantially homogeneous product.

8. A method of preparing a bituminous composition which comprises mixing a tar product from the group consisting of coal tar, water-gas tar, their oils and pitches with from about 5% to about 50% of impsonite based on the weight of the mixture, and heating the mixture at a temperature of about 290° C. to 330° C. to digest and disperse the impsonite in the tar product to form a substantially homogeneous product.

9. A method of preparing a bituminous composition which comprises mixing coal tar with from about 5% to about 35% of impsonite based on the weight of the mixture, and heating the mixture at a temperature of about 290° C. to 330° C. to digest and disperse the impsonite in the coal tar to form a smooth, substantially homogeneous product having a low temperature-susceptibility factor.

10. A method of preparing a bituminous composition which comprises mixing a water-gas tar with from about 5% to about 35% of impsonite based on the weight of the mixture, and heating the mixture at a temperature of about 290° C. to 330° C. to digest and disperse the impsonite in the water-gas tar to form a smooth, stable, substantially homogeneous product having a low temperature-susceptibility factor.

11. A composition of matter for coating and adhesive purposes which comprises a coal tar solvent and a bituminous material formed by digestion of a tar product with an asphaltic pyrobituminous material having the following properties: specific gravity at 77° F., from about 1.1 to about 1.25; non-mineral constituents, more than 50% fixed carbon; solid at atmospheric temperatures; and substantially infusible.

12. A coating composition forming a protective covering when applied to a surface which comprises from 35 to 55 parts by volume of a coal tar solvent and from 65 to 45 parts of a bituminous material formed by digestion of a tar product with an asphaltic pyrobituminous material having the following properties: specific gravity at 77° F., from about 1.1 to about 1.25; non-mineral constituents, more than 50% fixed carbon; solid at atmospheric temperatures; and substantially infusible.

13. A coating composition forming a protective covering when applied to a surface which comprises about 45% by volume of coal tar heavy solvent naphtha distilling substantially between 150° and 200° C. and about 55% of a bituminous material formed by digestion of a tar product with impsonite.

14. A coating composition of gelatinous consistency which comprises about 35 to 40% by volume of a coal tar solvent and about 65 to 60% of a bituminous material obtained by digestion of a tar product with impsonite.

EDWARD JAMES CANAVAN.